May 20, 1941.　　M. G. COPLEN　　2,242,695
TREE MOVER
Filed July 21, 1938　　5 Sheets-Sheet 3
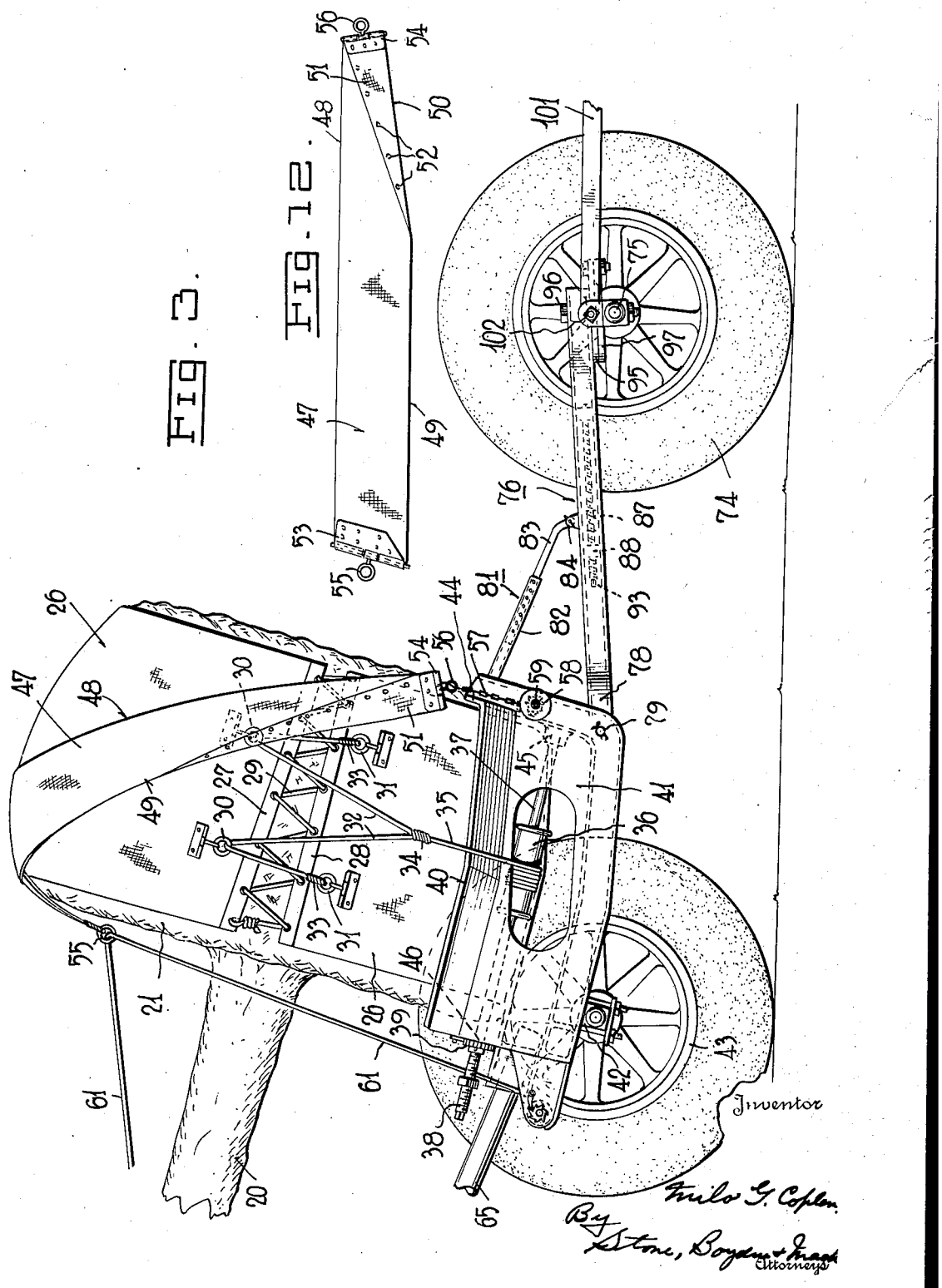

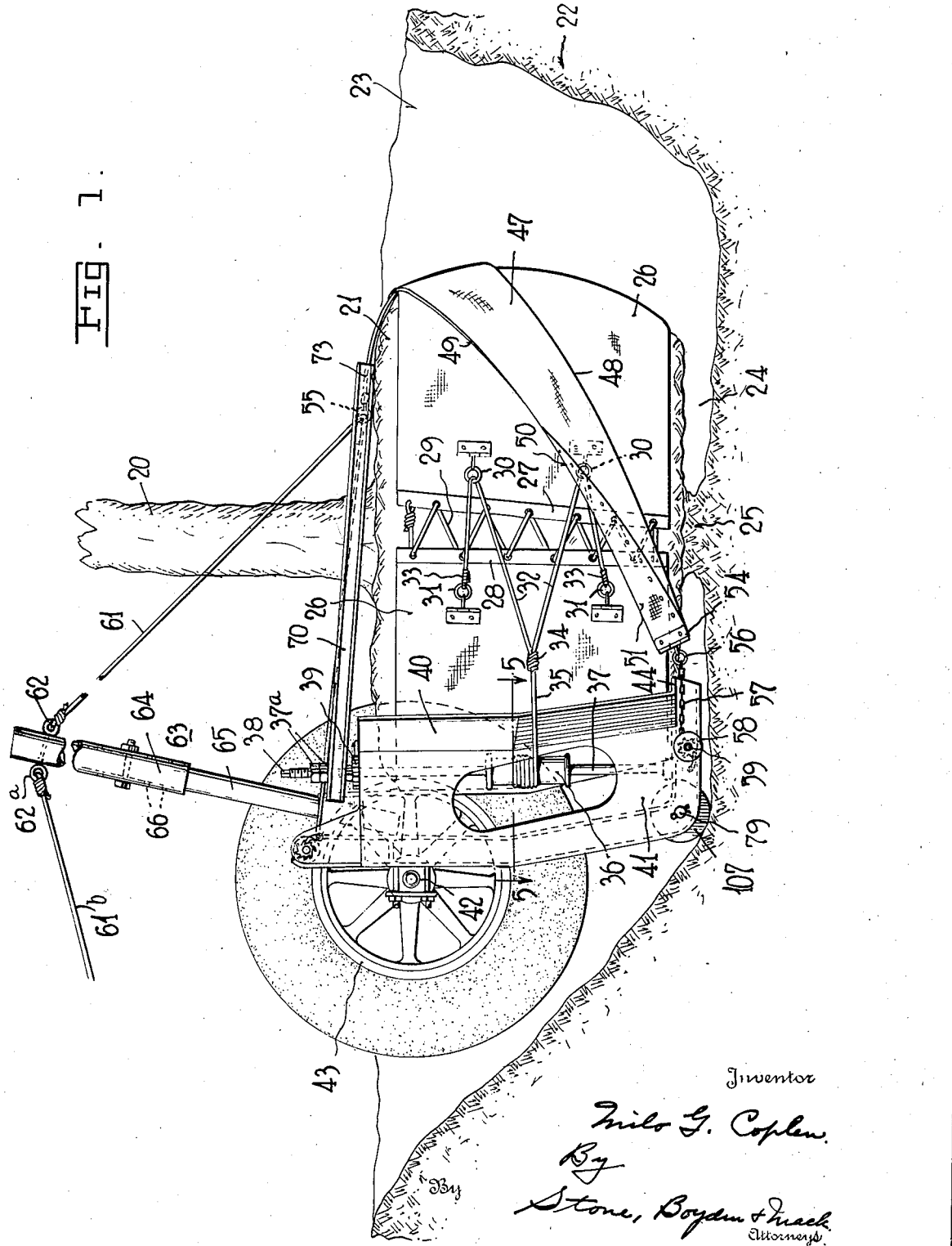

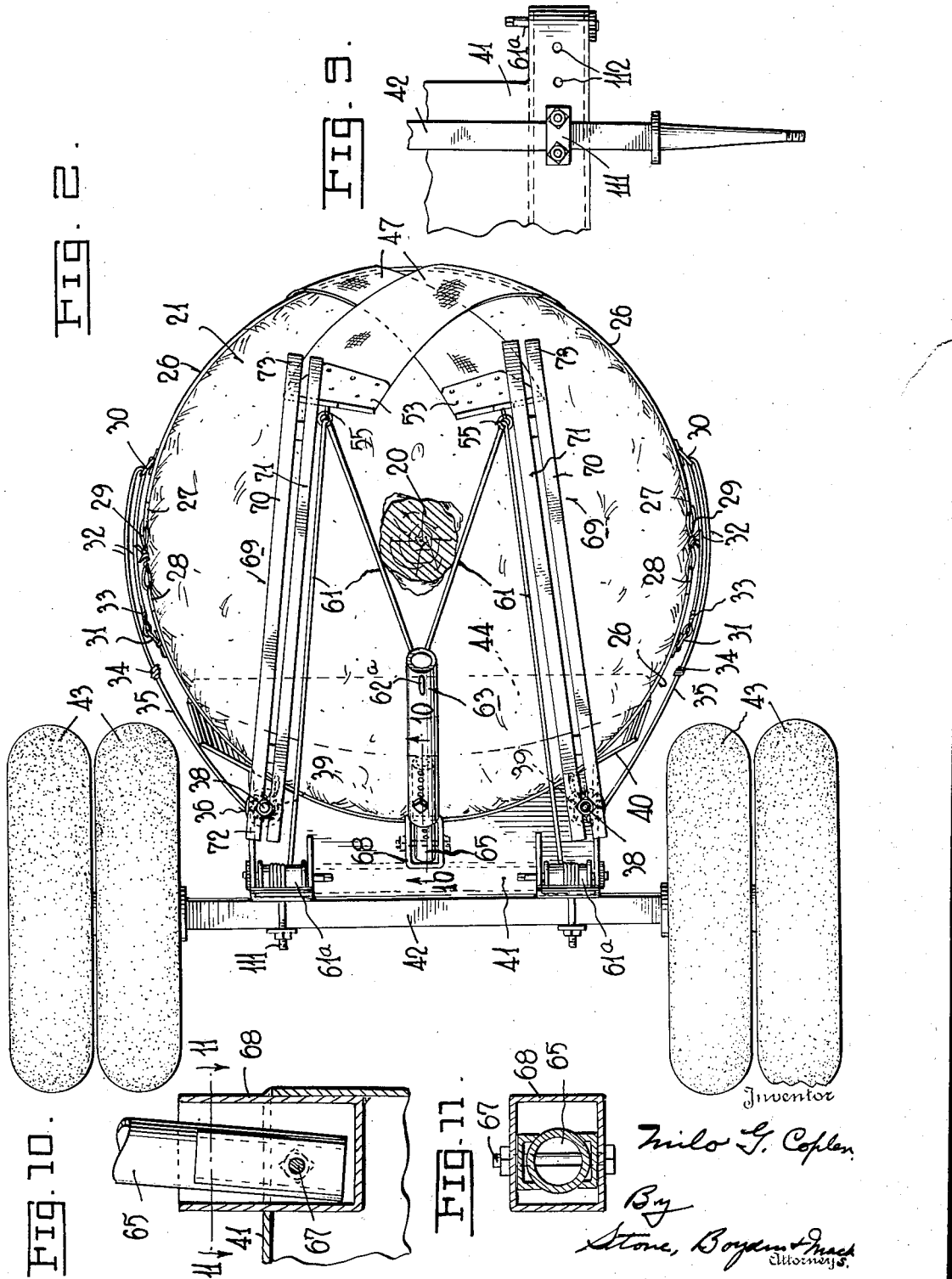

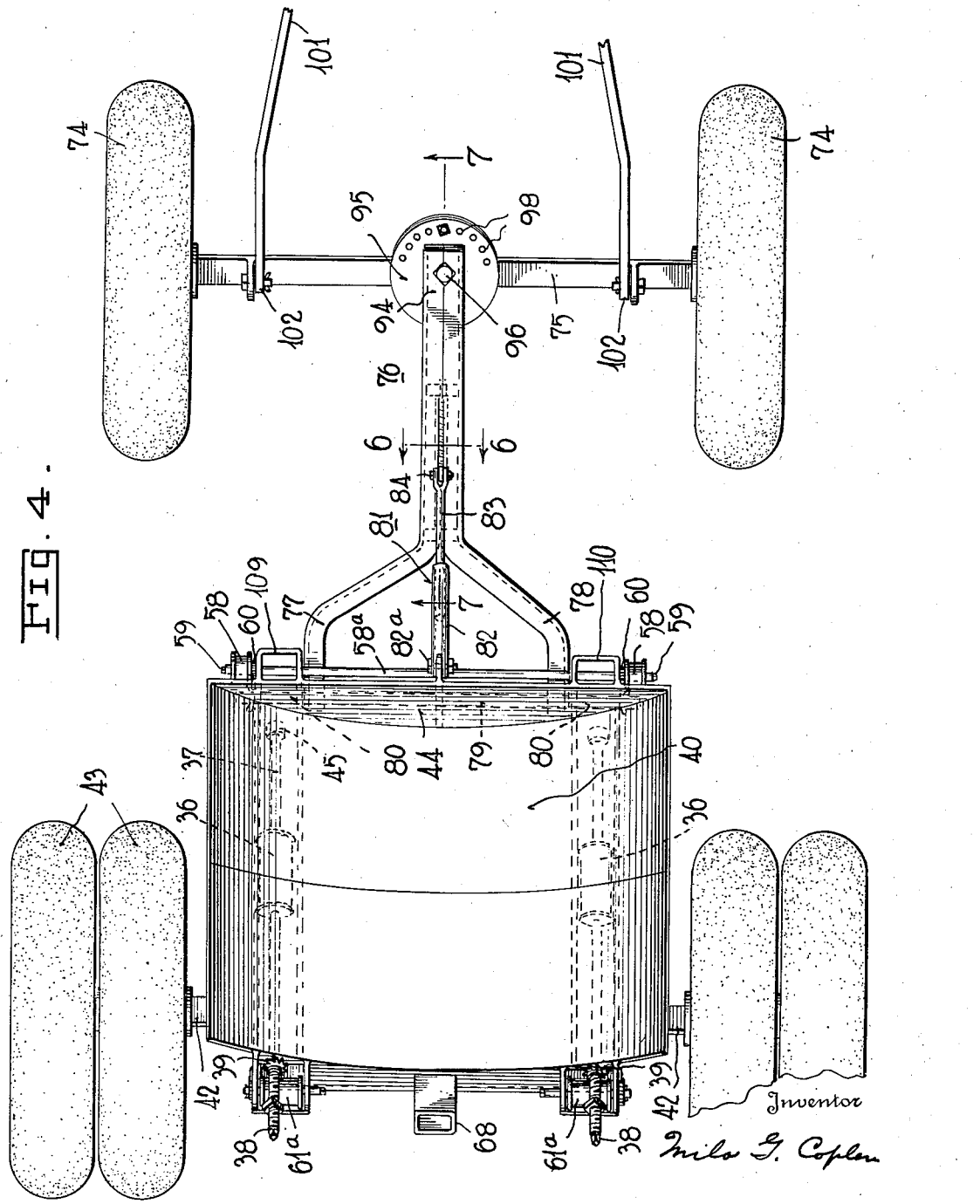

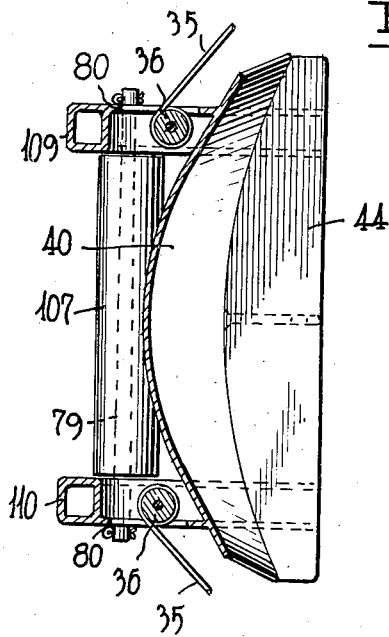
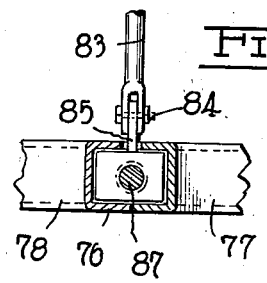
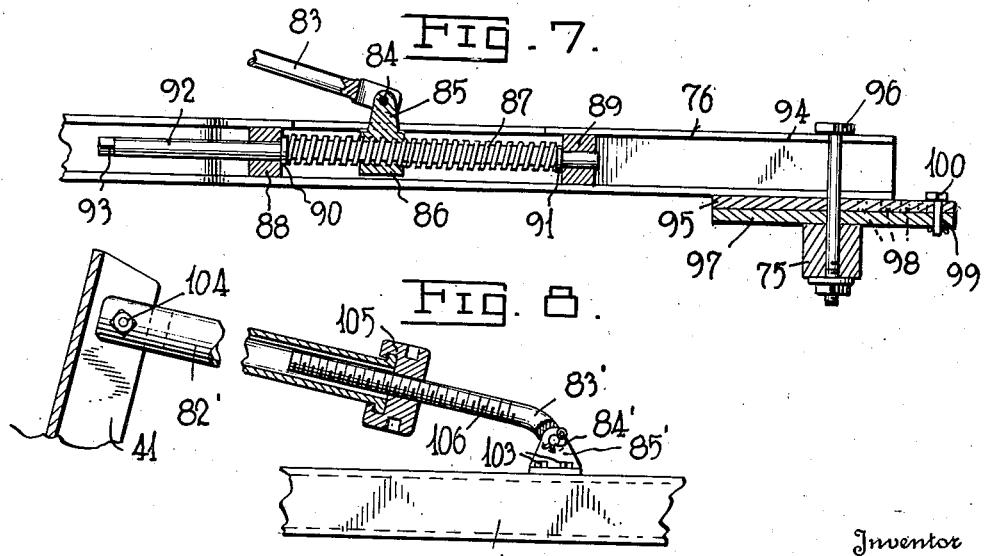

Patented May 20, 1941

2,242,695

UNITED STATES PATENT OFFICE 2,242,695

TREE MOVER

Milo G. Coplen, Rockville, Md.

Application July 21, 1938, Serial No. 220,556

15 Claims. (Cl. 214—3)

The present invention pertains to improvements in apparatus for moving trees from one location to another.

In my Patent No. 1,976,160, issued October 9, 1934, I disclosed a tree moving method and apparatus in which, during the movement, the tree is supported solely by the tree ball. Prior methods and apparatus have all involved some clamping or fastening to the tree trunk. This latter objectionable feature was eliminated by my former invention, and it is one object of my present invention to provide improved moving means in which the tree to be moved is supported entirely by its tree ball.

Another object of this invention is to provide improved means for securing the tree ball upon the moving apparatus.

A further object is to provide improvements in the running gear of the apparatus in order to facilitate its use during loading and unloading.

Other objects of my invention will be apparent from the accompanying description, drawings and claims.

In the drawings accompanying and forming a part of this application:

Fig. 1 is a side elevation of a portion of my apparatus shown in position about the earth ball before the latter is completely severed from its original location.

Fig. 2 is a top plan view corresponding to Fig. 1.

Fig. 3 is a side elevation of my apparatus completely assembled showing the tree in position to be transported.

Fig. 4 is a plan view of my apparatus completely assembled, but in an empty condition.

Fig. 5 is a horizontal sectional view taken on the line 5—5 of Fig. 1.

Fig. 6 is a vertical sectional view taken on the line 6—6 of Fig. 4.

Fig. 7 is a vertical sectional view taken on the line 7—7 of Fig. 4.

Fig. 8 is an enlarged view, partly in section, of an alternative form of brace to that shown in Figs. 3, 4 and 7.

Fig. 9 is a detailed view showing an adjustable mounting for the wheel axle of the rear carriage.

Fig. 10 is a vertical sectional view taken on the line 10—10 of Fig. 2.

Fig. 11 is a horizontal sectional view taken on the line 11—11 of Fig. 10.

Fig. 12 is a view showing the construction of one of the diagonal holding straps constituting an important part of my invention.

Referring now to the drawings, and particularly to Figs. 1, 2 and 3, the reference numeral 20 designates a trunk of the tree to be moved, and 21 the tree ball. The latter is shown almost completely cut away from the surrounding earth 22 by means of the trench 23 and undercutting 24, leaving the tree ball connected to its original location only at 25.

The tree ball 21 is shown wrapped by the two flexible bands 26 of a width substantially equal to the height of the tree ball. On each side of the tree ball the two adjacent ends 27 and 28 of the bands 26 are shown tightly pulled together by means of the lacing 29. In order to thus tightly lace the ends of the bands together means are provided whereby they may be drawn one toward the other. These means include rings 30 and rings 31 fastened adjacent the ends 27 and 28 respectively of flexible bands 26. Flexible lines 32 on each side of the tree ball slidably pass through rings 30 and are secured at one end 33 to rings 31. The other ends of lines 32 are joined together as at 34, and to single lines 35 wound upon drums 36 at each side of the apparatus. Each drum 36 is secured to and driven by a shaft 37 suitably mounted for turning in the frame of the apparatus as will be hereinafter described. At the upper end of shafts 37 means 38 are provided for securing cranks thereto whereby turning of shafts 37 can be effected. Conventional pawl and ratchet means 39 are provided for holding the shafts 37 against reverse movement.

The tree ball 21 wrapped as aforesaid is shown resting against a cradle 40 mounted on a supporting framework 41 to which is secured the axle 42 supporting at each end thereof wheels 43. The lower end of cradle 40 is provided with a flange 44 for partially supporting the tree ball while the latter is in a vertical position. The cradle supporting framework 41 is also provided with bearings as at 45 and 46 (Fig. 3) for revolvably supporting the shafts 37.

In order to securely lash the tree ball to the cradle as shown two straps 47 are provided of a shape suitable to facilitate their being diagonally extended across one side of the tree ball in crisscross relation to each other. These straps, one of which is shown extended in its flat condition in Fig. 12, have one entirely straight edge 48, their other edge having a portion 49 parallel to edge 48 and a second portion 50 inclined to edge 48. In the embodiment shown the inclined edge 50 is made by folding over a portion 51 of the strap and securing this portion to the main body by means of rivets or other fastening means 52. The two lower ends 53 and 54 of the strap extend diagonally outwardly from the straight side 48 as shown. To these ends which are located at the root side of the tree ball, fastening rings 55 and 56 are secured.

The application of straps 47 in securing the tree ball 21 to the cradle 40 is shown in Figs. 1, 2 and 3. Each ring 56 is fastened to one end of a chain 57, each of the latter being wound upon a drum 58 secured to a shaft 58a (Fig. 4) journalled upon framework 41. Shaft 58a is provided with a crank attaching means 59 and conventional pawl and ratchet means 60. Rings 55 at the other and upper end of straps 47, namely the ends toward the trunk side of the earth ball, have slidably passing through them flexible lines 61. One end of each of lines 61 is secured to a winch 61a (Fig. 2) similar in construction to winches 58 and mounted upon framework 41 at opposite ends thereof. The other ends of line 61 are secured to one of two rings 62 mounted upon lever arm 63, which latter extends generally lengthwise of the trunk and is connected to the cradle 40 for tilting the same and the tree to be carried thereby as will be explained. To the other of said two rings 62 a line 61b is attached and extends to a suitable source of power, such as a winch, not shown, whereby the lever may be pulled over. It will thus be noted that when force is applied to the lever arm 63 to pull it over and thus separate or lift the earth ball, such force is transmitted through the lines 61 to the outer edge of the earth ball. Concurrently with the application of such lifting force, the earth ball is also pressed by the diagonal straps 47 increasingly firmly toward the cradle 40.

Lever arm 63 is shown as comprising a hollow pipe like element 64 telescopically engaging a second element 65, with means 66 for adjustably securing elements 64 and 65 together to vary the length of the lever arm 63. The lower end of the element 65 is pivotally mounted as at 67 (Fig. 10) within the hollow member 68. The inside of member 68 is considerably larger than element 65 to permit relative movement of the two about the pivotal point 67. Hollow member 68 is mounted upon the rear end of framework 41 supporting the cradle 40.

To assist in securing the earth ball to the cradle, members 69 composed of parallel elements 70 and 71 may be secured at one end 72 to the shafts 37 of the winches 36 by means of nuts 37a. The other ends 73 of members 69 engage the top of the earth ball 21 to furnish additional support for the latter particularly when the earth is soft.

The operation of that part of my apparatus described above is as follows:

The tree ball having been wrapped with bands 26 and the rear carriage of my apparatus having been brought into the position shown in Fig. 1, the bands 26 are tightened and secured upon the tree ball by means of the winches 36 as described. Straps 47 are next applied and the tree ball securely fastened by their use upon the cradle 40. The length of lever arm 63 is suitably adjusted before fastening the straps 47 thereto by means of lines 61, and is then employed to pull the tree ball out of its hole, the carriage pivoting about the wheels 43.

The rear carriage carrying the tree is now held in the position shown in Fig. 3 and the front carriage is secured thereto.

This front carriage includes a pair of wheels 74 mounted upon axle construction 75. (See Figs. 3 and 4).

The front carriage includes coupling member 76 for connection with the rear carriage. This member includes a bifurcated construction with arms 77 and 78 pivoted on removable shaft 79 journalled at 80 on framework 41. For rigidly securing the two carriages together means are provided including a brace 81 composed of telescopic elements 82 and 83. Element 82 is pivotally mounted as at 82a to the frame 41 of the rear carriage while element 83 is pivotally secured as at 84 to an arm 85 (Fig. 7) secured to nut 86 engaging a screw 87 mounted in bearing blocks 88 and 89 secured to coupling member 76. The screw 87 is provided with shoulders 90 and 91 for engaging the bearing blocks 88 and 89 and preventing longitudinal movement of the screw. At one end of the screw 87 is secured a shaft 92 extending through the bearing block 88, and provided with means at 93 for attaching a crank, whereby the screw may be turned and the nut 86 moved longitudinally with respect to the coupling member 76. To the front end 94 of member 76 is rigidly secured a circular plate 95. Extending through the plate 95 and the front end 94 of member 76 is kingbolt 96, the latter also extending through a second circular plate 97 rigidly secured to the axle 75. This construction permits of relative turning movement between axle 75 and coupling member 76 for steering purposes. Means are also provided, however, for locking together the discs 95 and 97 and thus preventing this turning movement when desired. These means include a series of holes 98 in disc 95, any one of which may be aligned with a hole 99 in disc 97, and a bolt 100 secured therein. It is thus seen that axle 75 may be secured in any one of a number of different angular positions with respect to member 76.

Towing means 101 of any desired form may be secured to the side of axle 75 opposite the point of connection of coupling member 76, as at 102.

In Fig. 8 an alternative form is shown for the connecting brace between the rear and front carriages. In this form of the invention, element 83' of the brace is pivoted as at 84' to a bracket 85' rigidly secured as by bolts 103 to the coupling member 76'. One end of element 82' of the brace is pivotally secured as at 104 to frame 41 of the rear carriage. Swiveled upon the element 82' is a nut 105 engaging screw threads 106 carried by element 83'.

It will be readily apparent that by turning nut 105 the over-all length of the brace 82'—83' can be readily varied.

In order to facilitate the positioning of the rear carriage as shown in Fig. 1, roller 107 may be provided. This roller may be mounted upon the same detachable shaft 79 (Figs. 4 and 5) extending between and journalled at 80 in frame elements 109 and 110 forming a part of the cradle framework 41, which shaft, as described above, is employed for securing coupling member 76 to the rear carriage.

When the tree has been loaded upon the rear carriage and the latter pulled out of the hole, roller 107 may then be removed by sliding out the shaft 79. Arms 77 and 78 of the coupling member 76 may then be secured to the cradle framework 41 by means of the same shaft 79 as is most clearly shown in Fig. 4.

In order to facilitate the use of my invention with tree balls of various sizes it may be desired to shift the location of the rear carriage axle 42 with respect to the cradle supporting framework 41. One way of accomplishing this purpose is shown in Fig. 9. Detachable clamping means 111 may be employed for securing said axle in any one of several different positions by means of the series of holes 112.

With reference to the details of the mounting of the lever arm 63 and especially as to the mounting of the lower end associated element 65, it will be noted from Figs. 10 and 11 that the element 65 has limited pivotal movement in a vertical plane within the hollow member 68 about the pivot pin 67. In other words, when the lever 63 moves the element 65 about the pin 67, the limited pivoting thereon is possible due to the fact that the opening of the member 68 is greater up and down than the dimensions of the element 65. Thus to a limited extent the lever 63 and the element 65 can be moved slightly with respect to the hollow casing 68 when a tree is being upset from the growing position to the moving position, before the element 65 engages the end edge of the hollow casing 68. This permissible restricted movement of the lever and its mounting 65 on the hollow casing 68 is an important factor in the use of the equipment because it provides for yieldable adaptation of the apparatus to the task of upsetting the tree and accepting the load thereof, whereas too great rigidity where the lever 63 is coupled to the cradle and its running gear would otherwise increase the chance of breakage. The reason why the lever 63 functions better when the socket therefor thus permits movement of the lever in a vertical plane will be clear from the following explanation.

With reference to Figure 1, it will be noted that the work of breaking the earth ball loose at its lower central point and lifting the earth ball to tilt the tree and earth ball over and about the axle 42 as a pivot point is performed by use of the lever 63. Mention has already been made of the fact that the line or cable 61b may be coupled to a tractor or winch, not shown. The line of force from 61b is carried through the lines 61 down through the belts 47 to the outer periphery of the earth ball. It will thus be noted that the lever 63 does not exert its force as a lever by action against the walls of the socket or hollow member 68 but more correctly the lever has its lower end simply seated in the socket, even though such seating include a pivotal mounting, as shown in Figs. 10 and 11. One of the most important functions of the lever 63 is to space the point of application of power through the lines 61b as far as possible along the tree trunk from the earth ball and in that relation the pulling force on the cable 61b, so far as the lever is concerned, is chiefly a downward thrust of the lever on its pivotal mounting.

Now, as to the chance of breakage, if the lever was not pivotally mounted, but was merely firmly seated in a tightly fitting socket, as for example when a mast is stepped in a socket, it would tend to break off at the rim of the socket for the following reason. When the power is applied to the line 61b from the tractor or other source of power, the lines 61 and the belts 47 naturally yield somewhat, thus apparently lengthening, and such lengthening action would result in permitting the lever 63 to move toward the direction of pull on the cable 61b with the result that a tremendous strain would be placed on the mounting of the lower end of the lever and if it was in a socket the lever would either bend or break at that point. However, by having a measure of flexibility in the lower mounting of the lever, the lever adapts itself to the change in the length of the lines 61 and straps 47. It is desirable that the lateral movement of the lever at its lower end be limited so that the lever may be used in steering the wheels 43 and the cradle 40 when directing the latter to the excavation about a tree to be moved.

With the above explanation it is thought that my present invention will be readily understood. I have described my invention by reference to my preferred embodiment thereof, but numerous modifications and changes therein will at once be apparent to those skilled in the art. Therefore, I do not wish to be limited to the specific form of my invention shown and described above, but wish to include within the scope of my patent all the subject matter contained within the following claims.

I claim:

1. In a tree moving apparatus, a tree ball supporting cradle mounted on wheels, said cradle being adapted to receive the side of a tree ball so that when a tree is transported the trunk thereof extends generally lengthwise of the path of travel of the cradle and the cradle faces upwardly, means for securing the tree ball to the cradle including a strap extending diagonally about the tree ball from the root side of the ball and having its upper end toward the trunk side of the ball, a lever connected to said cradle and extending lengthwise of the trunk for tilting said cradle, and a connection between the upper end of said strap and said lever.

2. In a tree moving apparatus, a tree ball supporting cradle mounted on wheels, said cradle being adapted to receive the side of a tree ball so that when a tree is transported the trunk thereof extends generally lengthwise of the path of travel of the cradle and the cradle faces upwardly, means for securing the tree ball to the cradle including a strap extending diagonally about the tree ball from the root side of the ball and having its upper end toward the trunk side of the ball, fastening means at the opposite ends of said strap for tightening the same to hold the tree ball to said cradle, including a winding element fixedly mounted with respect to said cradle, a lever connected to said cradle and extending lengthwise of the trunk for tilting said cradle, and a connection between the upper end of said strap and said lever.

3. In a tree moving apparatus, a tree ball supporting cradle mounted on wheels, said cradle being adapted to receive the side of a tree ball so that when a tree is transported the trunk thereof extends generally lengthwise of the path of travel of the cradle and the cradle faces upwardly, means for securing the tree ball to the cradle including a strap extending diagonally about the tree ball from the root side of the ball and having its upper end toward the trunk side of the ball, fastening means at the opposite ends of said strap for tightening the same to hold the tree ball to said cradle, including a winding element fixedly mounted with respect to said cradle adjacent the forward end of the latter and so located as to be at the trunk side of the earth ball after the cradle is loaded, a lever connected to said cradle and extending lengthwise of the trunk for tilting said cradle, and a connection between the upper end of said strap and said lever.

4. In a tree moving apparatus, a tree ball supporting cradle mounted on wheels, said cradle being adapted to receive the side of a tree ball so that when a tree is transported the trunk thereof extends generally lengthwise of the path of travel of the cradle and the cradle faces upwardly, means for securing the tree ball to the cradle including a strap extending diagonally about the tree ball from the root side of the ball and having its upper end toward the trunk side of the ball, fastening means at the opposite ends of said strap for tightening the same to hold the tree ball to said cradle, including a winding element fixedly mounted with respect to said cradle adjacent the rear end of the latter and so located as to be at the side of the earth ball opposite to the trunk after the cradle is loaded, a lever connected to said cradle and extending lengthwise of the trunk for tilting said cradle, and a connection between the upper end of said strap and said lever.

5. In a tree moving apparatus, a tree ball supporting cradle mounted on wheels, said cradle being adapted to receive the side of a tree ball so that when a tree is transported the trunk thereof extends generally lengthwise of the path of travel of the cradle and the cradle faces upwardly, means for securing the tree ball to the cradle including a strap extending diagonally about the tree ball from the root side of the ball and having its upper end toward the trunk side of the ball, fastening means at the opposite ends of said strap for tightening the same to hold the tree ball to said cradle, including two winding elements fixedly mounted with respect to said cradle, one adjacent the forward end, and the other the rear end, of said cradle, a lever connected to said cradle and extending lengthwise of the trunk for tilting said cradle, and a connection between the upper end of said strap and said lever.

6. In a tree moving apparatus, a tree ball supporting cradle mounted on wheels, said cradle being adapted to receive the side of the tree ball so that when a tree is transported the trunk extends generally lengthwise of the path of travel of the cradle and the cradle faces upwardly, and means for securing the tree ball to the cradle including strap means extending about the tree ball at right angles to the trunk and having end portions adjacent each other, and common means secured with respect to said cradle and fixedly secured to one of said end portions and slidably connected to the other of said end portions whereby the strap may be tightened about the tree ball and concurrently drawn toward said cradle.

7. In a tree moving apparatus, a tree ball supporting cradle mounted on wheels, said cradle being adapted to receive the side of the tree ball so that when a tree is transported the trunk extends generally lengthwise of the path of travel of the cradle and the cradle faces upwardly, and means for securing the tree ball to the cradle including strap means adapted to pass around the tree ball at right angles to the trunk, and having end portions adjacent each other, a winch secured with respect to said cradle, and means common to said winch and to said strap means secured with respect to said winch and fixedly secured to one of said end portions and slidably connected to the other of said end portions whereby the strap may be tightened and the tree ball concurrently drawn toward said cradle.

8. In a tree moving apparatus, a tree ball supporting cradle mounted on wheels, said cradle being adapted to receive the side of the tree ball so that when a tree is transported the trunk extends generally lengthwise of the path of travel of the cradle and the cradle faces upwardly, a lever coupled to said cradle and adapted to extend lengthwise of a tree trunk when the earth ball thereof is carried by said cradle whereby the tree and its ball may be tilted, and means for securing the earth ball on said cradle and with respect to said lever comprising a strap having one end secured adjacent said cradle at the lower side of the earth ball, said strap passing upwardly and diagonally about the earth ball and with an upper end toward said lever, a winch secured with respect to said cradle, a cable secured to said lever at a point removed from said cradle and leading to and having a sliding connection with said upper end of said strop, and thence extending to and secured to said winch, whereby the side of said earth ball farthest from said cradle may be concurrently pulled toward said cradle and tilted over with said cradle.

9. In a tree moving apparatus, a tree ball supporting cradle mounted on wheels, said cradle being adapted to receive the side of the tree ball so that when a tree is transported the trunk extends generally lengthwise of the path of travel of the cradle and the cradle faces upwardly, and means for securing the tree ball to the cradle including a plurality of strap sections extending about the tree ball at right angles to the trunk and arranged end to end and with one pair of adjacent ends at one side of the tree ball and another pair of adjacent ends at the opposite side of the tree ball, common tightening means duplicated at either side of said cradle whereby said strap sections may be tightened about the ball and concurrently drawn toward said cradle, each common tightening means including an element fixedly secured to one strap end portion and extending therefrom to and slidably connected to the adjacent end portion and thence extending toward said cradle to which it is adjustably secured.

10. In a tree moving apparatus, a tree ball supporting cradle mounted on wheels, said cradle being adapted to receive the side of the tree ball so that when a tree is transported the trunk extends generally lengthwise of the path of travel of the cradle and the cradle faces upwardly, and means for securing the tree ball to the cradle including a plurality of strap sections extending about the tree ball at right angles to the trunk and arranged end to end and with one pair of adjacent ends at one side of the tree ball and another pair of adjacent ends at the opposite side of the tree ball, common tightening means duplicated at either side of said cradle whereby said strap sections may be tightened about the ball and concurrently drawn toward said cradle, each common tightening means including an element fixedly secured to one strap end portion and extending therefrom to and slidably connected to the adjacent end portion and thence extending toward said cradle, and a winch at either side of said cradle to which said last mentioned extending end of said common tightening means is secured for tightening the same.

11. A strap for use in securing tree balls to tree movers having a straight side from end to end, the end edges extending diagonally outwardly from said straight side, the side opposite the straight side having one end portion, the edge of which is parallel to said straight side, and the opposite end portion of the same side extending diagonally with respect to said straight side, and fastening elements secured to each end of said strap.

12. A strap for use in securing tree balls to tree movers having a straight side from end to end, the end edges extending diagonally outwardly from said straight side, the side opposite the straight side having one end portion, the edge of which is parallel to said straight side, and the opposite end portion of said strap having a portion adjacent the end thereof folded over toward said straight side, thus to provide a tapered end portion, and fastening elements secured to each end of said strap.

13. In a tree moving apparatus, a tree ball supporting cradle mounted on wheels, a lever coupled to the cradle whereby the tree and its ball may be tilted, and a coupling for the lever including a socket element mounted adjacent the cradle and adapted to receive in the socket thereof the adjacent end of said lever element, a pivotal connection between the socket element and the end of the lever therein, the respective size of the socket opening and the exterior of the lever therein being such that a rocking movement of the lever within the socket is permissible.

14. In a tree moving apparatus, a tree ball supporting cradle mounted on wheels, a lever coupled to the cradle whereby the tree and its ball may be tilted, and a coupling for the lever including a socket element mounted adjacent the cradle and adapted to receive in the socket thereof the adjacent end of said lever element, a pivotal connection between the socket element and the end of the lever therein, the side walls of the socket element closely embracing the side walls of the lever element to afford a sliding movement therebetween but substantially no lateral movement and the distance between the upper and lower walls of the socket element being substantially greater than the dimensions of the lever element within the socket whereby limited pivotal movement of the lever within the socket is permitted.

15. In a tree moving apparatus, a tree ball supporting cradle, said cradle being adapted to receive the side of a tree ball so that when a tree is transported the trunk thereof extends generally lengthwise of the path of travel of the cradle and the cradle faces upwardly, means for securing the tree ball to the cradle including flexible elements extending diagonally about the tree ball from the root side of the ball and having their upper ends toward the trunk side of the ball, a lever connected to said cradle and extending lengthwise of the trunk for tilting said cradle and connections between the upper ends of said flexible elements and said lever.

MILO G. COPLEN.